United States Patent [19]

Yarger et al.

[11] Patent Number: 5,082,683

[45] Date of Patent: Jan. 21, 1992

[54] AMIDE/AMINE ESTER DERIVATIVES AS LOW CALORIE FAT MIMETICS

[75] Inventors: Ronald G. Yarger, Covent Station; Lawrence P. Klemann, Somerville; John W. Finley, Whippany, all of N.J.

[73] Assignee: Nabisco Brands, Inc., Parsippany, N.J.

[21] Appl. No.: 562,109

[22] Filed: Aug. 1, 1990

[51] Int. Cl.$^5$ .............................................. A23D 9/00
[52] U.S. Cl. ................................. 426/601; 260/404; 260/404.5; 426/603; 426/611; 426/612
[58] Field of Search .............. 426/601, 603, 606, 611, 426/612, 531; 260/404.5, 404

[56] References Cited

U.S. PATENT DOCUMENTS

| | | | |
|---|---|---|---|
| 519,980 | 5/1894 | Winter. | |
| 2,962,419 | 11/1960 | Minich | 168/81 |
| 3,495,010 | 2/1970 | Fossel | 424/312 |
| 3,579,548 | 5/1971 | Whyte | 260/410.7 |
| 3,600,186 | 8/1971 | Mattson et al. | 99/1 |
| 3,637,774 | 1/1972 | Babayan et al. | 260/410.6 |
| 3,876,794 | 4/1975 | Rennhard | 426/152 |
| 3,969,087 | 7/1976 | Saito et al. | 44/270 |
| 4,005,195 | 1/1977 | Jandacek | 424/180 |
| 4,304,768 | 12/1981 | Staub et al. | 424/180 |
| 4,508,746 | 4/1985 | Hamm | 426/601 |
| 4,582,927 | 4/1986 | Fulcher | 560/201 |
| 4,797,300 | 1/1989 | Jandacek et al. | 426/549 |
| 4,830,787 | 5/1989 | Klemann et al. | 260/410 |
| 4,840,815 | 1/1989 | Meyer et al. | 426/611 |
| 4,849,242 | 7/1989 | Kershner | 426/601 |
| 4,861,613 | 8/1989 | White et al. | 426/611 |
| 4,915,974 | 4/1990 | D'Amelia et al. | 426/611 |
| 4,927,659 | 5/1990 | Klemann et al. | 426/611 |

FOREIGN PATENT DOCUMENTS

| | | |
|---|---|---|
| 1106681 | 10/1978 | Canada. |
| 0205273 | 7/1986 | European Pat. Off. . |
| 0233856 | 11/1987 | European Pat. Off. . |
| 3529564 | 6/1987 | Fed. Rep. of Germany. |
| 2021579 | 5/1978 | United Kingdom. |

OTHER PUBLICATIONS

Streitwieser, A. and Heathcock, C. H., Introduction to Organic Chemistry, 1981, p. 567, Macmillan Publishing Co., Inc., New York.

Booth, A. N. and Gros, A. T., J. Amer. Oil Chem. Soc. 40: 551-553 (1963).
Goodman and Gilman's Pharmacological Basis of Therapeutics, 7th ed., Macmillian Publishing Co. 1002-1003 (1985).
Gottenbos, J. J., Chap. 8 in Beare-Rogers, J., ed., Dietary Fat Requirements in Health and Development A.O.C.S. 107-112 (1988).
Hamm, D. J., Food Sci. 49: 419-428 (1984).
Haumann, B. D., J. Amer. Oil Chem. Soc. 63: 278-288 (1986).
Hess, K., and Messmer, E., 54B Ber. 499-523 (1921), A Full German Text and English Translation.
La Barge, R. G., Food Tech. 42: 84-90 (1988).
Meade, J. et al. Lipids, Plenum, New York pp. 549-470 (1986).
Stryker, W. A., Arch. Path. 31: 670-692 (1941).
Oette, K., and Tschung, T. S., Hoppe-Seyler's Z. Physiol. Chem. 361: 1179-1191 (1980), Translation included.

*Primary Examiner*—Donald E. Czaja
*Assistant Examiner*—Leslie Wood

[57] ABSTRACT

Amide/amine ester derivatives of the general formula:

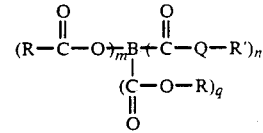

where
  B is an aliphatic group having 2 to 6 carbons,
  each R is independently, an aliphatic group having 1 to 23 carbons,
  Q is —N(R')— or —O—(CH$_2$)$_p$—N(R')—,
  R' is —H, —R or —(CO)—R, independently,
  m=0 to 3,
  n=1 to 3,
  p=2 to 4, and
  q=0 to 3
comprise a new class of low calorie fat mimetics. Edible compositions incorporating and methods of using the new fat mimetics are disclosed.

19 Claims, No Drawings

AMIDE/AMINE ESTER DERIVATIVES AS LOW CALORIE FAT MIMETICS

BACKGROUND OF THE INVENTION

This invention relates to the use of amide/amine ester derivatives as low calorie fat mimetics. These compounds have an aliphatic backbone to which is attached at least one aliphatic or acyl group in amide, aminoalkyl ester, or oxyalkyl amide linkage, and up to six aliphatic groups in ester linkage.

Dietary fat is the most concentrated source of energy of all the nutrients, supplying 9 kcal/gram, about double that contributed by either carbohydrate or protein. The amount of fat in the American diet has increased in the last 60 years by about 25% (Mead, J., et al. Lipids, Plenum, N.Y., 1986, page 459), so that fats now provide approximately 40% of the daily caloric intake. Moreover, technological advances in the food industry, including efficient and safe hydrogenation procedures, have changed the kind of fat in foods.

Because fats are high in calories and because certain fats appear to pose a health risk when consumed in large quantities over time, a number of national advisory committees on nutrition have made recommendations differing in detail, but the common theme is a reduction in the total amount of fat in the diet (Gottenbos, J.J., chapter 8 in Beare-Rogers, J., ed., *Dietary Fat Requirements in Health and Development*, A.O.C.S. 1988, page 109). Yet fat contributes to the palatability and flavor of food, since most food flavors are fat-soluble, and to the satiety value, since fatty foods remain in the stomach for longer periods of time than do foods containing protein and carbohydrate. Furthermore, fat is a carrier of the fat-soluble vitamins, A, D, E, and K, and the essential fatty acids, which have been shown to be important in growth and in the maintenance of many body functions. Hence, major research efforts have focused open ways to produce food substances that provide the same functional and organoleptic properties as fats, but not the calories.

A number of fat replacements have heretofore been suggested (recently reviewed by Hamm, D. J., *J. Food Sci.* 49: 419-428 (1984), Haumann, B. J., *J. Amer. Oil. Chem. Soc.* 63: 278-188 (1986) and LaBarge, R. G., Food Tech. 42: 84-90 (1988). Hamm divides replacement fats into two broad categories: structurally re-engineered triglycerides modified to retain their conventional functional properties in foods, while removing their susceptibility toward hydrolysis or subsequent absorption during digestion, and materials developed from chemistry unrelated to triglycerides.

Examples of the former class of triglyceride analogues include compounds having the glycerol moiety replaced with alternate polyols (e.g., pentaerythritol in U.S. Pat. No. 2,962,419 to Minich, or sugars, suggested by Hess, K., and Messmer, E., 54B Ber. 499-523 (1921), and patented years later by Mattson and Volpenhein, U.S. Pat. No. 3,600,186, and Meyer, et al., U.S. Pat. No. 4,840,815); compounds having the fatty acids replaced with alternate acids (e.g., branched esters as described in U.S. Pat. No. 3,579,548 to Whyte); compounds having insertions between the glycerol and the fatty acids (e.g., ethoxy or propoxy groups in U.S. Pat. No. 4,861,613 to White and Pollard); compounds having reversed esters (e.g., malonates in U.S. Pat. No. 4,582,927 to Fulcher and trialkoxytricarballylates in U.S. Pat. No. 4,508,746 to Hamm); and compounds having the ester bonds replaced by ether bonds (Can. Pat. No. 1,106,681 to Trost).

Examples of Hamm's second category of fat replacements chemically unrelated to triglycerides are mineral oil (suggested as early as 1894 in U.S. Pat. No. 519,980 to Winter); polyglucose and polymaltose (U.S. Pat. No. 3,876,794 to Rennhard); jojoba wax (W. Ger. Pat. No. 3,529,564 to Anika); polyoxyalkylene esters (U.S. Pat. No. 4,849,242 to Kershner); polyvinyl alcohol esters (U.S. Pat. No. 4,915,974 to D'Amelia and Jacklin); and polysiloxane (Eur. Pat. Ap. No. 205,273 to Frye).

Nondigestible or nonabsorbable edible fat replacements have proved disappointing when tested in feeding trials, where gastrointestinal side effects occurred, in some cases so extreme that frank anal leakage was observed. Nondigestible fats appear to act as a laxative and are expelled from the body, eliciting foreign body reactions like those early documented for mineral oil (Stryker, W. A., Arch. Path. 31 670-692 (1941), more recently summarized in Goodman and Gilman's Pharmacological Basis of Therapeutics, 7th ed., Macmillan Pub. Co., N.Y. 1985, pp. 1002-1003). Similarly, a series of experimental fats, e.g., glyceride esters of dibasic acids, synthesized by U.S.D.A. in the 1960's exhibited undesirable gastrointestinal side effects when the compounds were fed to rats (Booth, A.N., and Gros, A. T., *J. Amer. Oil Chem. Soc.* 40: 551-553 (1963)); in several of the balance studies, the diarrhea was so extreme that digestibility coefficients could not be calculated (ibid., Table I, p. 552).

Polyglycerol and polyglycerol esters, suggested as fat replacements by Babayan and Lehman (U.S. Pat. No. 3,637,774), have been suggested for use as fecal softening agents as well (U S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, incorporating saturated fatty groups, Eur. Pat. Ap. No. 233,856 to Bernhardt, or mixing residues, U.S. Pat. No. 4,797,300 to Jandacek, et al.), and dietary fiber preparations have been incorporated into polysaccharide and/or polyol-containing foodstuffs to help inhibit the diarrheal effect (U.S. Pat. No. 4,304,768 to Staub et al.). Partially digestible fat replacements have also been suggested (U.S. Pat. No. 4,830,787 to Klemann and Finley; U.S. Pat. No. 4,849,242, cited above; and U.S. Pat. No. 4,927,659 to Klemann, et al.).

SUMMARY OF THE INVENTION

An object of the present invention is to provide a fat mimetic having substantially fewer calories than normal fat. It is a further object of the present invention to provide a new group of edible fat replacement compounds having an array of functional groups that can be selected to tailor the properties of the compounds and modulate caloric availability while minimizing laxative side effects.

These and other objects are accomplished by the present invention, which describes the use of amide/amine ester derivatives comprising a new class of edible synthetic fat mimetics, methods of using them, and food compositions incorporating them. These compounds have an organic backbone to which is attached at least one aliphatic or acyl group in amide, aminoalkyl ester, or oxyalkyl amide linkage. The compounds may also have up to three aliphatic groups in conventional ester linkage and up to three aliphatic groups in reversed ester linkage.

The new fat mimetics may be described by the general formula:

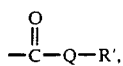

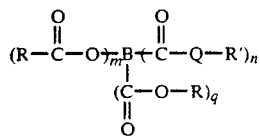

where
B is an aliphatic group having 2 to 6 carbons,
each R is independently, an aliphatic group having 1 to 23 carbons,
Q is —N(R′)— or —O—(CH$_2$)$_p$—N(R′)—,
R′ is —H, —R or —(CO)—R, independently,
m = 0 to 3,
n = 1 to 3,
p = 2 to 4, and
q = 0 to 3.
Preferred compounds have m+n+q = 2 to 4.

DETAILED DESCRIPTION OF THE INVENTION

This invention describes a new class of edible fat mimetics comprising amide/amine ester derivatives of the formula

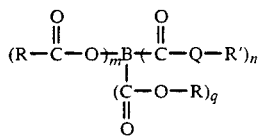

where
B is an aliphatic group having 2 to 6 carbons
each R is independently, an aliphatic group having 1 to 23 carbons,
Q is —N(R′)— or —O—(CH$_2$)$_p$—N(R′)—,
R′ is —H, —R or —(CO)—R, independently,
m = 0 to 3,
n = 1 to 3,
p = 2 to 4, and
q = 0 to 3.

The compounds of this invention comprise aliphatic backbones (B) to which are attached at least one and as many as three (n) aliphatic or acyl groups (R′) in amide, aminoalkyl ester, or oxyalkyl amide linkage (—(CO)—Q—, with Q as defined above); zero to three (m) aliphatic groups (R) in conventional ester linkage (—O(CO)—); and zero to three (q) aliphatic R groups in reversed ester linkage (—(CO)—O—).

Aliphatic backbone B has 2 to 6 carbons, and may be linear or branched, saturated or unsaturated. Backbone B may be derived from a polyfunctional structure such as an hydroxycarboxylic acid or the like using any one of a number of synthetic schemes summarized at the end of this section.

Zero to 3 (m) aliphatic R groups are attached to backbone B in conventional ester linkage as compared to triglycerides. The R groups so attached may be derived by esterifying hydroxyl groups on backbone B precursor compounds with fatty acids. By "fatty acids" is meant organic acids of the formula RCOOH. Fatty acids may be natural or synthetic, saturated or unsaturated. Example fatty acids include, but are not limited to, acetic, propionic, butyric, caproic, caprylic, pelargonic, capric, undecanoic, lauric, myristic, palmitic, stearic, arachidic, palmitoleic, oleic, vaccenic, linoleic, linolenic, eleostearic, arachidonic, eicosapentaenoic, and the like acids.

Mixtures of fatty acids may also be used, such as those obtained from the hydrolysis of non-hydrogenated, partially hydrogenated or fully hydrogenated soybean, safflower, sunflower, high oleic sunflower, sesame, peanut, corn, olive, rice bran, canola, babassu nut, coconut, palm, palm kernel, lupin, nasturtium seed, mustard seed, cottonseed, low erucic rapeseed or marine oils. Fatty acids derived from other fats, such as dairy butterfat, tallow or lard, or plant waxes such as jojoba may be employed. Specific fractions of natural or processed oils, fats or waxes may also be used, such as, for example, high (above 40° C.), low (below 10° C.) or middle (0° to 40° C.) melting fractions.

Zero to three (q) aliphatic R groups are attached to backbone B in reversed ester linkage as compared to triglycerides. The R groups so attached may be derived by acylating carboxylic groups on backbone precursor compounds with fatty alcohols. By "fatty alcohol" is meant a compound of the formula RCH$_2$OH, wherein R is an aliphatic group that is saturated or unsaturated, branched or straight chain. Example fatty alcohols have similar chain lengths and configurations as their fatty acid counterparts listed above, and include propyl, butyryl, hexyl, caprylyl, pelargonyl, capryl, undecanyl, lauryl, myristyl, palmityl, stearyl, arachidyl, palmitoleyl, oleyl, vaccenyl, linoleyl, linolenyl, eleostearyl, arachidonyl, eicosapentaenyl, and the like alcohols. Fatty alcohols obtained from natural or processed oils, fats, and waxes mentioned above, and specific fractions thereof, may also be employed.

At least 1, and as many as 3 (n) aliphatic or acyl R′ groups are attached in amide, aminoalkyl ester, or oxyalkyl amide linkage, in the formula above, denoted

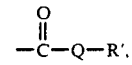

wherein
Q = —N(R′)— or —O—(CH$_2$)$_p$—N(R′)—
R′ = —H, —R, or —(CO)—R, independently, and
p = 2 to 4.

As is apparent from the formula, when an R′ is attached as an amide, the Q groups may be one of two types: —N(R′)— or —N(R′)(CH$_2$)$_p$O—. In the former, the R′ is attached as a simple amide, which may be envisioned structurally as a derivative of a carboxylic acid of the formula:

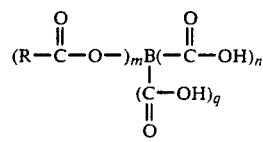

where B, m, n, q, and R are as defined above. This type of amide/amine ester derivative thus includes compounds of the formula

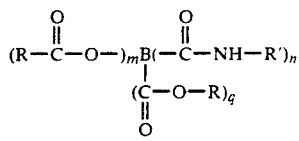

and compounds of the formula

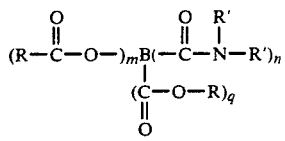

wherein B, m, n, q, R and R' are as defined above.

Another type of amide/amine ester derivative comprises amides having R' attached in a n oxyalkyl amide linkage. Compounds of the formula

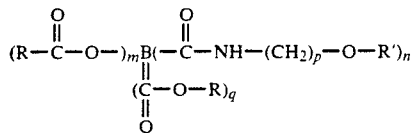

and compounds of the formula

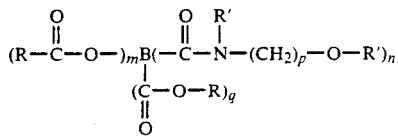

wherein B, m, n, p, q, R and R' are as defined above, are included in this group. The resulting structures may have ester (when R' is acyl) or ether (when R' is aliphatic) bonds in the side chain substituents attached to nitrogen.

A third type of amide/amine ester derivative comprises those having at least one R' group attached to B in amino ester linkage. When R' is acyl, the resulting side chain substituents are acylamino ester groups, and when R' is aliphatic, the resulting side chain substituents are alkylamino ester groups. Compounds of this type may be envisioned as derivatives of acylated hydroxycarboxylic acids of the formula

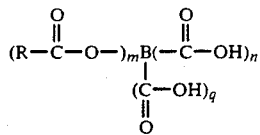

which are esterified with hydroxyalkylamines or hydroxyacyl amines of the formula HO—(CH$_2$)$_p$—N(R')R', with B, R', m, n, p, and q as defined above. These include compounds of the formula

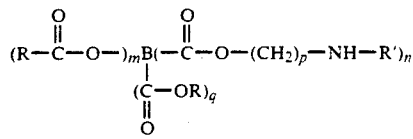

and compounds of the formula

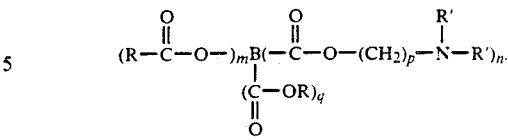

Generally, the compounds have two or more R or R' groups,
i.e., $m+n+q \geq 2$ in the general formula above. Many embodiments have $m+n+q=2$ to 4. The R and R' groups are selected to provide a discernible fatty character in the compounds. Most of the R and R' groups have 2 to 4 or more carbon atoms, with a majority containing 3 to 23, more narrowly 10 to 20, and even more narrowly, 16 to 18 carbon atoms. Preferred amide/amine ester derivatives can have an array of R and R' groups selected to include 95% derived from acids having 14 to 18 carbon atoms. In one embodiment, the R and R' should be predominantly saturated and derived from $C_{14}$ to $C_{18}$ acids In another embodiment, R and R' should be predominantly derived from unsaturated $C_{16}$ to $C_{18}$ acids (with a preponderance of mono-unsaturated groups). R and R' groups derived from specific natural or processed oil fractions may be selected functionally; for chocolate or confectionary applications, for example, R and R' may be derived from high melting fractions, salad oil applications may employ medium melting fractions, and so forth.

The choice, number and arrangement of R and R' groups on the amide/amine ester derivatives will affect the biological as well as physical properties of the compounds. Some compounds of this invention are noncaloric. Where any of the groups are hydrolyzed, the caloric value of the compound may increase. Where a group is metabolized, it may be a highly desirable or essential fatty acid residue such as linoleic acid.

Some compounds are partially digestible. By this is meant that the compounds deliver less than 9 kcal/gram, preferably less than 5, and, in some embodiments, less than 3 kcal/gram, upon being metabolized.

The amide/amine ester derivatives of this invention may be incorporated either alone, or in combination with another fat and/or fat mimetic, into any food composition or used in conjunction with any edible material. Other fats include natural triglycerides rich in highly desirable or essential fatty acids, such as oleic, linoleic, linolenic, or eicosapentaenoic acid, triglycerides bearing fatty acids having beneficial attributes such a those associated with conjugated linoleic acid isomers, medium chain triglycerides and the like. Other fat mimetics include any heretofore suggested as edible fat replacements, including, but not limited to, sugar esters, neoalkyl esters, polyglycerol esters, malonate esters, propoxylated glycerols, retrofats, carboxy/carboxylates, polyvinyl alcohol esters, and the like.

The term "edible material" is broad and includes anything edible, whether or not intended for nutrition, e.g., it can be an additive such as an antioxidant for fats or oils, an antispatter agent, an emulsifier, a texture modifier such as a plasticizer for chewing gum, a component for cosmetics, or other minor functional ingredient such as a carrier or diluent for use in flavorings, pharmaceuticals, and the like.

Representative of fat-containing food products which can comprise, in addition to other food ingredients, the amide/amine ester compounds of this invention in full or partial replacement of natural or synthetic fat are: frozen desserts, e.g., frozen novelties, ice cream, sherbet, ices, or milk shakes; puddings and pie fillings; margarine substitutes or blends; flavored bread or biscuit spreads; mayonnaises and mustards; salad dressings; filled dairy products such as filled cream or filled milk; dairy or non-dairy cheese spreads; coffee lighteners, liquid and dried; flavored dips; frying fats and oils; reformed and comminuted meats; meat substitutes or extenders; pet foods; egg products and substitutes; nut products, such as peanut butter; whipped toppings; compound coatings; frostings and fillings; cocoa butter replacements or blends; candy, especially fatty candies such as those containing peanut butter or chocolate; chewing gum; breakfast cereals; bakery products, e.g., cakes, breads, rolls, pastries, cookies, biscuits, and crackers; mixes or ingredient premixes for any of these; as well as flavor, nutrient, drug or functional additive delivery systems.

The following is a list of representative, but not limiting, examples of amide/amine esters of this invention:

(A) Amide esters having the formula

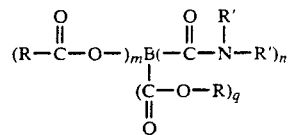

where
B = an aliphatic group having 2 to 6 carbons,
each R = independently, an aliphatic group having 2 to 23 carbons,
R' = H, —R, or —(CO)—R, independently
m = 0 to 3,
n = 1 to 3, and
q = 0 to 3.

Examples of this type of amide ester derivative include

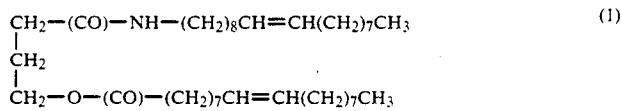

(1)

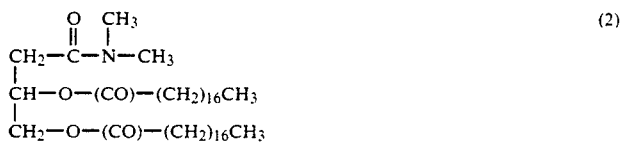

(2)

(3)

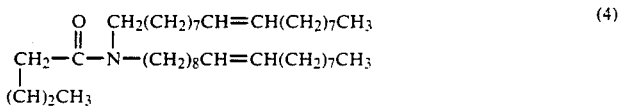

(4)

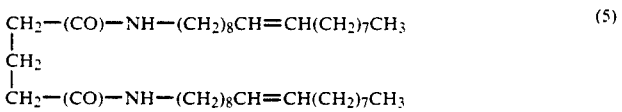

(5)

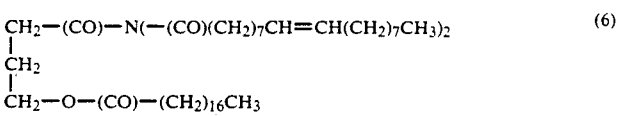

(6)

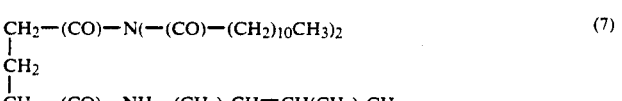

(7)

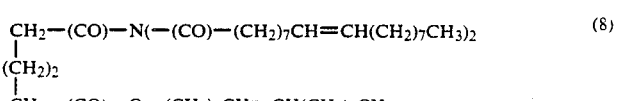

(8)

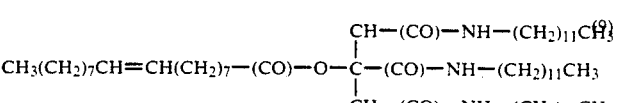

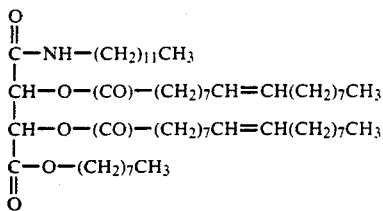
(10)

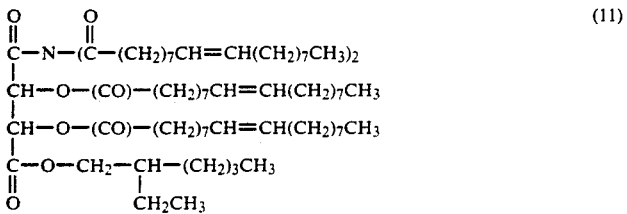
(11)

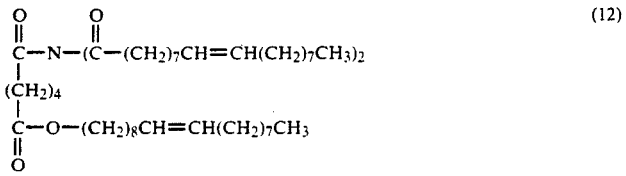
(12)

(B) Amide esters having the formula

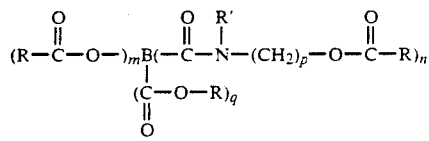

where
B = an aliphatic group having 2 to 6 carbons,
each R = independently, an aliphatic group having 2 to 23 carbons,
R' = H, —R, or —(CO)—R, independently,
m = 0 to 3,
n = 1 to 3,
p = 2 to 4, and
q = 0 to 3.
Examples of this type of amide ester derivatives include

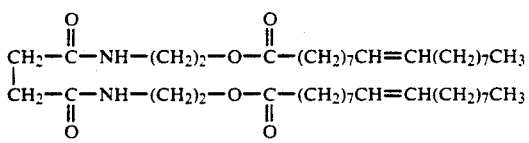
(13)

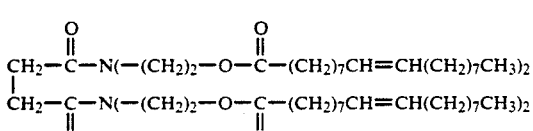
(14)

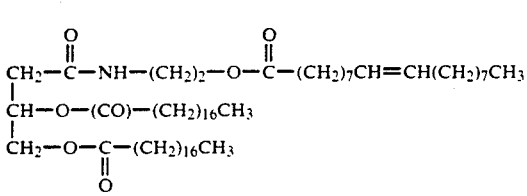
(15)

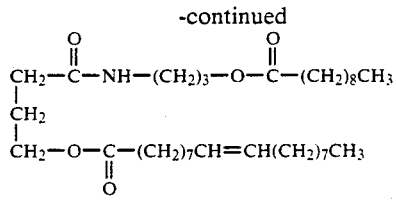
(16)

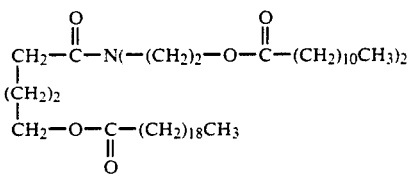
(17)

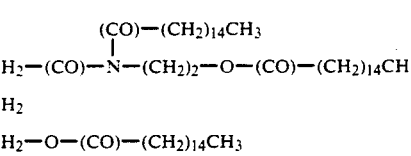
(18)

(C) Alkylaminoalkyl or acylaminoalkyl esters having the formula

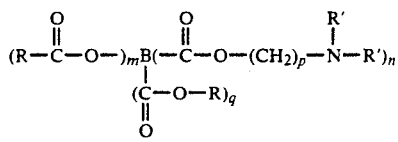

where
B = an aliphatic group having 2 to 6 carbons,
each R = independently, an aliphatic group having 2 to 23 carbons,
R' = —H, —R, or —(CO)—R, independently,
m = 0 to 3,
n = 1 to 3,
p = 2 to 4, and
q = 0 to 3.

Examples of this class include

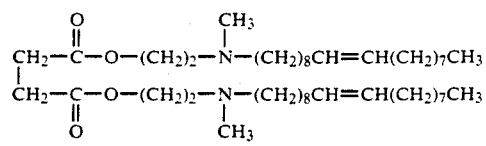
(19)

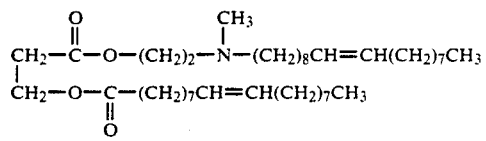
(20)

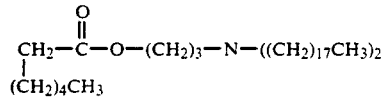
(21)

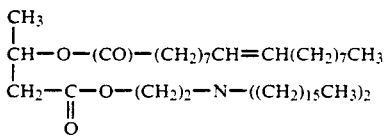
(22)

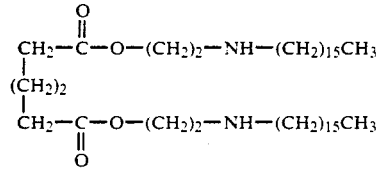
(23)

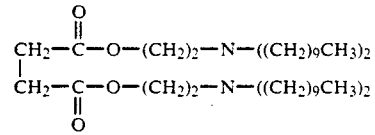
(24)

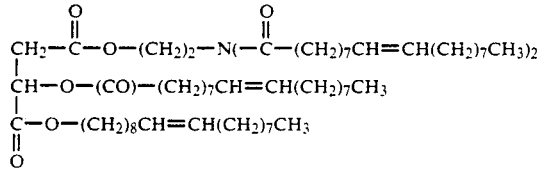
(25)

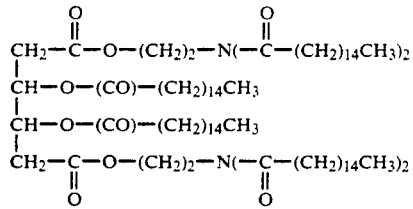
(26)

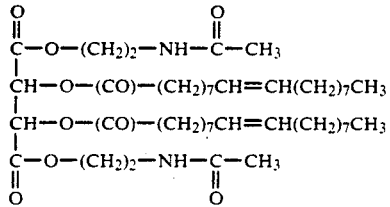
(27)

Any of the above compounds can be prepared with modified properties by substituting any of the specific R and/or R' groups with any other disclosed above, including mixtures derived from natural sources. For example, the last compound may be prepared with a mixture derived from soybean oil.

Example syntheses of specific compounds are set out in the next section. Briefly described, where the backbones comprise carboxylic acid esters and acylamide moieties, the synthesis may begin with a polyfunctional structure containing amide and carboxylic acid residues. Addition of a fatty acid chloride either in the presence of a solvent such as pyridine or, more preferably, in the complete absence of solvent affords an acylamido carboxylic acid. Reaction of the latter with an appropriate amount of aliphatic or fatty alcohol with application of heat and vacuum (~100° to 150° C., 0.5 to 200 Torr) provides a fat-like composition containing carboxylic acid ester and acylamide moieties.

Where the compound backbones comprise carboxylic acid ester and alkylamide moieties, the synthesis may begin with a polyfunctional structure containing amide and carboxylic acid residues. Addition of an appropriate amount of an aliphatic or a fatty alcohol and application of heat and vacuum (e.g., 100° to 150° C., 0.5 to 200 Torr) provides a composition containing amide and carboxylic acid ester residues. Addition of an alkyl halide (especially a bromide or iodide) in a solvent which promotes nucleophilic displacement reactions and application of heat produces a dialkylamide and/or alkylamide functionality, and completes the synthesis of a fat-like composition containing carboxylic acid ester and alkylamide moieties.

Where the compound backbones comprise carboxylic acid ester, acylamide, and acyloxy moieties, the synthesis may begin with a polyfunctional structure containing amide, carboxylic acid, and hydroxyl residues. Addition of an appropriate amount of an aliphatic or a fatty alcohol and application of heat and vacuum (e.g., about 100° to 150° C., 0.5 to 200 Torr) provides a composition containing amide, hydroxyl, and carboxylic acid ester residues. Addition of an appropriate amount of a fatty acid chloride, with application of heat and vacuum, permits reaction of amide and hydroxyl sites to yield a fat-like composition containing carboxylic acid ester, acylamide, and acyloxy moieties.

Where the compound backbones comprise carboxylic acid ester, alkylamide, and acyloxy moieties, the synthesis may begin with a polyfunctional structure containing carboxylic acid and hydroxyl residues. Addition of an appropriate amount of an alkylamine with application of heat and vacuum yield an alkylamide site, leaving one or more carboxylic acid residues unreacted. Addition of an appropriate amount of an aliphatic or a fatty alcohol and application of heat and vacuum (e.g., about 100° to 150° C., to 200 Torr) provides a composition containing alkylamide, hydroxyl, and carboxylic acid ester residues. Addition of an appropriate amount of a fatty acid chloride, with application of heat and vacuum permits reaction of the remaining hydroxyl functions to yield a fat-like composition containing carboxylic acid ester, alkylamide, and acyloxy moieties.

Where the compound backbones comprise alkylamide and acyloxy moieties, the synthesis may begin with a polyfunctional structure containing carboxylic acid and hydroxyl residues. Reaction with sufficient oxalyl chloride, thionyl chloride, or the like transforms the carboxylic acid residues to the corresponding carboxylic acid chloride sites. Addition of an appropriate amount of an alkylamine with application of heat and vacuum in the presence of a scavenger base (pyridine, triethylamine, etc.) yield alkylamide sites. Addition of an appropriate amount of a fatty acid chloride, with application of heat and vacuum permits reaction of the remaining hydroxyl functions to yield a fat-like composition containing alkylamide and acyloxy moieties.

Where the compound backbones comprise acyiamide and acyloxy moieties, the synthesis may begin with a polyfunctional structure containing carboxylic acid and hydroxyl residues. Reaction with ammonium hydroxide creates ammonium carboxylate groups which, upon heating, decompose to amide residues. Addition of an appropriate amount of a fatty acid chloride, with application of heat and vacuum permits reaction of both the amide residues and the hydroxyl functions to yield a fat-like composition containing acylamide and acyloxy moieties.

EXAMPLES

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

In this example, 2-ethylhexyl N,N-dioleoyl 2,3-dioleoyltartrate monoamide, an amide ester derivative illustrated in structure (11) above, is prepared.

A 16.71 g (0.10 mole) sample of monoammonium tartrate is carefully heated to 120.C in a 100 mL round bottom flask under a vacuum of ~25 torr. This forms tartaric acid monoamide which is not further purified.

To the flask is added 13.0 g (0.10 mole) of 2-ethyl-1-hexanol and one drop of concentrated sulfuric acid. The contents are heated to 120.C for 1.5 hour, cooled to room temperature, and examined by thin-layer chromatography (90/10/5, v/v/v, using hexane/ethyl acetate/acetic acid) to assure complete esterification to 2-ethylhexyl tartrate monoamide.

This is not further purified, but is treated, dropwise, with 120.4 g (0.40 mole) of freshly prepared oleoyl chloride. The contents are rapidly stirred under a vacuum of 25 torr at room temperature for 2 hours, then heated to 80° C. for one hour. Upon cooling, the reaction mixture is chromatographed on a silica gel column and eluted with 5% ethyl acetate in hexane, yielding of 2-ethylhexyl N,N-dioleoyl 2,3-dioleoyltartrate monoamide.

EXAMPLE 2

Another amide/amine ester derivative of this invention, 3-O-oleoylcitric acid trilauramide (depicted in structure (9) above) is prepared.

A 500 mL round bottom flask fitted with an addition funnel, a condenser, a KOH trap and a vacuum take-off, is charged with 19.2 g (0.10 mole) of citric acid, and then treated, dropwise, with 38.1 g (0.30 mole) of oxalyl chloride. The reaction mixture, under a vacuum of ~25 torr, is gradually warmed to about 40° C. and rapidly stirred for one hour. Upon cooling, 55.6 g (0.30 mole) of dodecylamine is added cautiously via the addition funnel. The mixture is stirred for two hours, then examined by thin-layer chromatography to assure complete product formation.

Without further purification, the reaction mixture is treated, dropwise, with 30.1 g (0.10 mole) of oleoyl chloride. After one hour the esterification is complete, and the title compound, 3-O-oleoylcitric acid trilauramide, is isolated by silica gel column chromatography (90/10/5; hexane/ethyl acetate/acetic acid; v/v/v).

EXAMPLE 3

Another amide/amine ester derivative, oleyl N,N-dioleoyladipic acid monoamide (depicted as structure (12) above) is prepared in this example.

A 500 mL round bottom flask fitted with an addition funnel and condenser is charged with 16.3 g (0.10 mole) of adipic acid monoamide, and then esterified with 26.8 g (0.10 mole) of oleyl alcohol using 2 drops of conc. sulfuric acid and heating to 80° C. When the reaction is complete, as determined by thin-layer chromatography, the reaction is cooled to room temperature. The solution is diluted with 200 mL of ethyl acetate, and washed successively with 50 mL of 5% sodium bicarbonate (2x) and 50 mL water (2x). The organic phase is dried over magnesium sulfate, decanted, and concentrated to an oil (35 g).

This is transferred to a 500 mL round bottom flask fitted with a magnetic stirrer, a condenser having a vacuum take-off (leading to a KOH trap), and an additional funnel. To this is added, with stirring, 60.2 g (0.20 mole) of oleoyl chloride. When the reaction is complete, the title compound is purified by silica gel column chromatography using 5% hexane/ethyl acetate as eluant.

EXAMPLE 4

Margarine. A margarine may be prepared by emulsifying

|  | parts |
| --- | --- |
| Oil Phase Ingredients | |
| Fat Mimetic of Example 1 | 68.6 |
| Liquid Corn Oil | 0.55 |
| Partially Hydrogenated Corn Oil | 0.45 |
| Lecithin | 0.30 |
| Mono- and Di-Glycerides | 0.21 |
| Margarine Flavor and Color | 0.0062 |
| Aqueous Phase Ingredients | |
| Water | 25.8 |
| Whey | 1.00 |
| Salt | 2.00 |
| Sodium Benzoate | 0.086 |
| Potassium Sorbate | 0.066 |
| CaEDTA | 0.0015 | and passing the emulsion through a cool scraped surface heat exchanger in the usual process.

EXAMPLE 5

Sweet Chocolate. A low calorie sweet chocolate may be prepared by blending

| Ingredient | parts |
| --- | --- |
| Cocoa Powder | 1.0 |
| Sugar | 1.0 |
| To this is added a portion of | |
| Example 2 Fat Mimetic | 1.0 |

Mix thoroughly and pass through a refiner to reduce the particles to desired size. The material is conched, and the remaining fat mimetic is added. The mixture is poured into molds and quenched cooled. No tempering regimen is necessary.

EXAMPLE 6

Chocolate Chips. The chocolate prepared in Example 5 is deposited into nibs and processed in the usual process.

EXAMPLE 7

Chocolate Chip Cookies. Reduced calorie crisp chocolate chip cookies may be prepared by blending

| Ingredient | parts |
| --- | --- |
| Flour | 22.0 |
| Example 1 Fat Mimetic | 20.0 |
| Salt | 0.7 |
| Sodium Bicarbonate | 0.1 |
| Monocalcium Phosphate | 0.1 |
| Vanillin | 0.1 |
| Water | 8.0 |
| To this is added | |
| Sugar | 30.0 |
| which is mixed until dispersed. Then | |
| Example 6 Chocolate Chips | 19.0 | is added and mixed until just blended prior to depositing and baking in the usual process.

EXAMPLE 8

Chewy Chocolate Chip Cookies. Chewy chocolate chip cookies may be prepared by combining

| Ingredient | parts |
| --- | --- |
| Sugar | 24.3 |
| Invert Sugar | 20.0 |
| Flour | 13.7 |
| Example 3 Fat Mimetic | 13.0 |
| Frozen Whole Eggs | 2.0 |
| Sodium Bicarbonate | 0.1 |
| Monocalcium Phosphate | 0.1 |
| Vanillin | 0.1 |
| Water | 7.7 |
| To this is added | |
| Example 6 Chocolate Chips | 19.0 | and mixed until just dispersed prior to depositing and baking in the usual process.

EXAMPLE 9

Italian Sausage. To make Italian sausage, chop

| Ingredient | parts |
| --- | --- |
| Lean Beef | 52.6 |
| Lean Pork | 26.3 |
| Fat Mimetic of Example 2 | 9.8 |
| Pre-blend | |
| Salt | 1.7 |
| Chili Powder | 1.3 |
| Paprika | 0.9 |
| Coriander | 0.01 |
| Nutmeg | 0.01 |
| Ground Caraway | 0.005 |
| Celery | 0.005 |
| and add to meats. Add | |
| Pimento | 7.37 | with juice and chop until well mixed. Grind through ⅜" plate, stuff into casings and cook at 150° F. for 30 minutes. Smoke and package.

EXAMPLE 10

Bread. To make bread, combine

| Ingredient | parts |
| --- | --- |
| Flour | 52.0 |
| Water | 32.0 |
| Sugar | 5.0 |
| Fat Mimetic of Example 3 | 4.7 |
| Yeast | 2.5 |
| Nonfat Dry Milk | 2.5 |
| Salt | 1.3 |

The mixture is proofed four hours, punched down, panned and proofed until desired volume is achieved prior to baking, slicing, and packaging in the usual manner.

EXAMPLE 11

French Dressing. French dressing may be prepared by adding

| | Ingredient | parts |
| --- | --- | --- |
| | Water | 31.09 |
| to | Sugar | 15.00 |
| | Salt | 2.50 |
| | Spices | 2.40 |
| | Xanthan Gum | 0.25 |
| | Alginate | 0.14 |
| | Polysorbate 60 | 0.12 |
| and mixing three minutes. Then | | |
| | 120 Distilled Vinegar | 12.00 |
| and | Fat Mimetic of Example 3 | 36.50 | are added, mixed three minutes, and homogenized at 500 psi prior to filling in the usual process.

EXAMPLE 12

Sprayed Crackers. A dough prepared from

| Ingredient | parts |
| --- | --- |
| Flour | 100 |
| Sugar | 5.0 |
| Malt | 1.5 |
| Fat Mimetic of Example 1 | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product, then sprayed with Fat Mimetic of Example 2 prior to packaging.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. An edible composition comprising in addition to other edible ingredients, a fat mimetic of the formula:

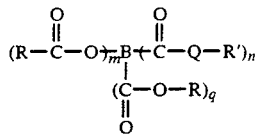

where
B is an aliphatic group having 2 to 6 carbons,
each R is independently, an aliphatic group having 1 to 23 carbons,
Q is —N(R')— or —O—(CH$_2$)$_p$-N(R')—,
R' is —H, —R or —(CO)—R, independently,
m=0 to 3,
n=1 to 3,
p=2 to 4, and
q=0 to 3.

2. A composition according to claim 1 wherein said fat mimetic comprises a compound of the formula

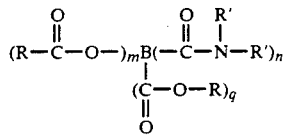

and m+n+q=2 to 4.

3. A composition according to claim 1 wherein said fat mimetic comprises a compound of the formula

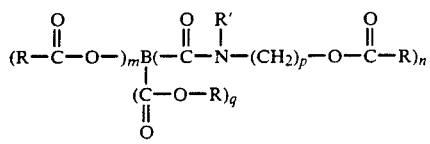

and m+n+q=2 to 4.

4. A composition according to claim 1 wherein said fat mimetic comprises a compound of the formula

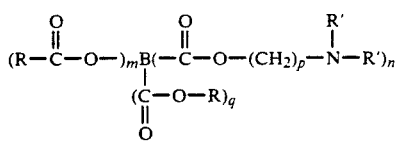

and m+n+q=2 to 4.

5. A composition according to claim 1 wherein B has 2 to 4 carbons, n=1, and q=0.

6. A composition according to claim 1 wherein B has 2 to 4 carbons, m=1 or 2 and n=1.

7. A composition according to claim 6 wherein wherein q=1 or 2.

8. A fat-containing food composition wherein at least a portion of said fat is at least partially replaced by a fat mimetic of the following formula:

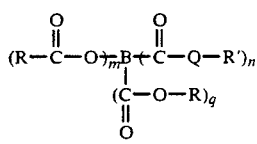

where
B is an aliphatic group having 2 to 6 carbons,
each R is independently, an aliphatic group having 1 to 23 carbons,
Q is —N(R')— or —O—(CH$_2$)$_p$—N(R')—,
R' is —H, —R or —(CO)—R, independently,
m=0 to 3,
n=1 to 3,
p=2 to 4, and
q=0 to 3.

9. A composition according to claim 8 wherein said food composition is selected from the group consisting of dairy products, bakery products, and salad dressings.

10. A composition according to claim 8 wherein said fat mimetic delivers less than 5 kcal/gram upon being metabolized.

11. A composition according to claim 10 wherein said fat mimetic delivers less than 3 kcal/gram upon being metabolized.

12. A composition according to claims 1 to 4 or 8 wherein R and R' have 10 to 20 carbons.

13. A composition according to claims 1 to 4 or 8 wherein R and R' is derived from acids selected from the group consisting of acetic, propionic, butyric, caproic, caprylic, pelargonic, capric, undecanoic, lauric, myristic, palmitic, stearic, arachidic, behenic, erucic, brassidic, palmitoleic, oleic, vaccenic, linoleic, linolenic, eleostearic, arachidonic and eicosapentaenoic acids, their alcohol counterparts, and mixtures thereof.

14. A composition according to claims 1 to 4 or 8 wherein R and R' are derived from mixtures of acids obtained from the hydrolysis of non-hydrogenated, partially hydrogenated or fully hydrogenated oils selected from the group consisting of soybean, safflower, sunflower, high oleic sunflower oil, sesame, peanut, corn, olive, rice bran, canola, babassu nut, coconut, palm, palm kernel, lupin, nasturtium seed, mustard seed, cottonseed, low erucic rapeseed, dairy butterfat and marine oil, and fractions thereof.

15. A method of reducing the calories in a food composition having an edible fat component, which method comprises formulating said composition with a fat mimetic of the formula:

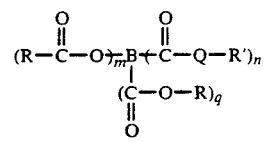

where
B is an aliphatic group having 2 to 6 carbons,
each R is independently, an aliphatic group having 1 to 23 carbons,
Q is —N(R')—or —O—(CH$_2$)$_p$—(NR')—,
R' is —H, —R or —(CO)—R, independently,
m=0 to 3,
n=1 to 3,
p=2 to 4, and
q=0 to 3.

16. A method according to claim 15 wherein m+n+q=2 to 4 and B has 2 to 4 carbons.

17. A method according to claims 15 or 16 wherein R and R' have 10 to 20 carbons.

18. A method according to claim 15 wherein R and R' are derived from acids selected from the group consisting of acetic, propionic, butyric, caproic, caprylic, pelargonic, capric, undecanoic, lauric, myristic, palmitic, stearic, arachidic, behenic, erucic, brassidic, lignoceric, cerotic, montanic, melissic, palmitoleic, oleic, vaccenic, linoleic, linolenic, eleostearic, arachidonic, nervonic and eicosapentaenoic acid, their alcohol counterparts, and mixtures thereof.

19. A method according to claim 15 wherein R and R' are derived from mixtures of acids obtained from the hydrolysis of non-hydrogenated, partially hydrogenated or fully hydrogenated oils selected from the group consisting of soybean, safflower, sunflower, high oleic sunflower oil, sesame, peanut, corn, olive, rice bran, canola, babassu nut, coconut, palm, palm kernel, lupin, nasturtium seed, mustard seed, cottonseed, low erucic rapeseed, dairy butterfat and marine oil, and fractions thereof.

* * * * *